Oct. 30, 1928.  1,689,223
J. H. BAUSCHARD
HEAD SPACING DEVICE
Filed March 11, 1926
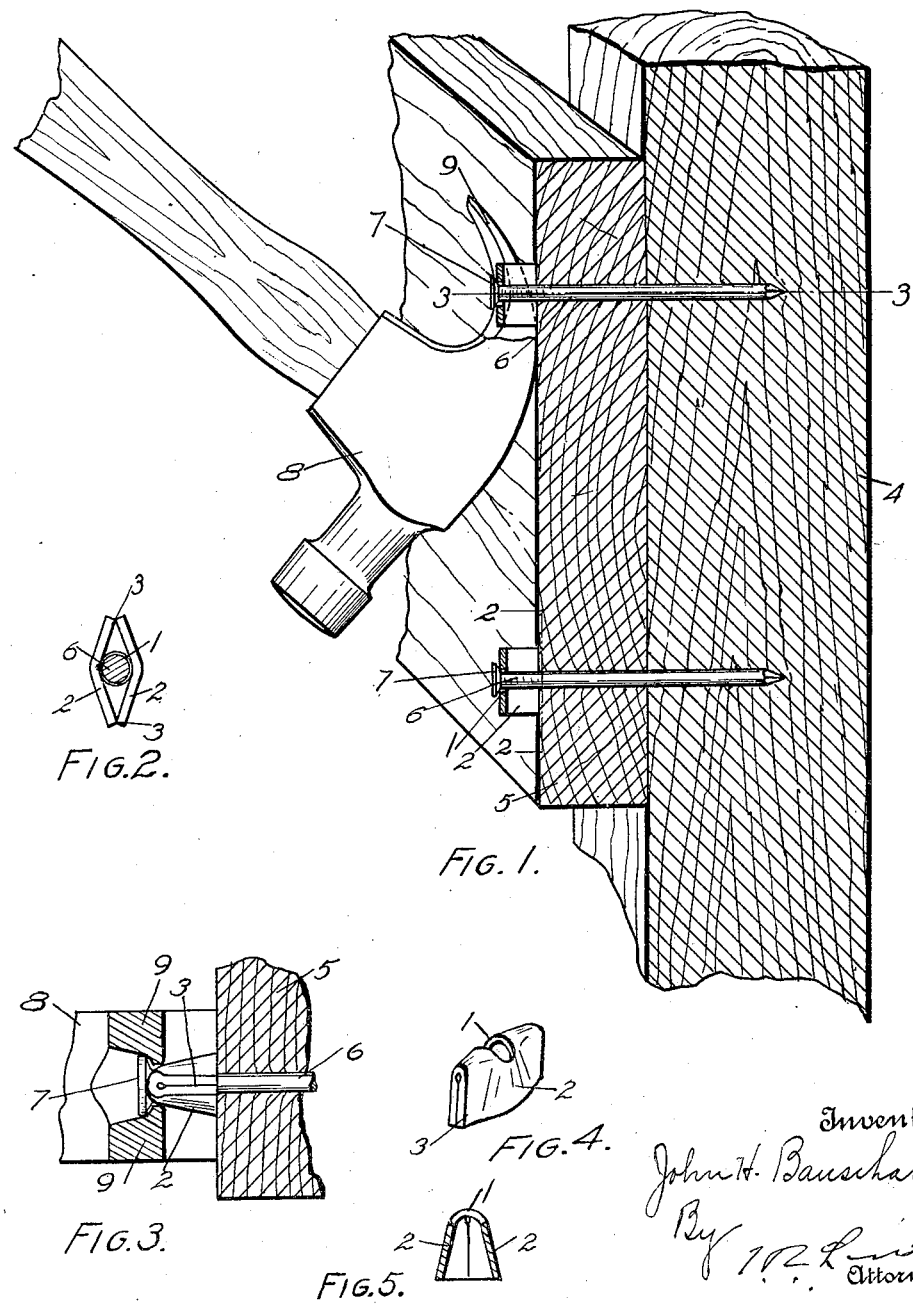

Patented Oct. 30, 1928.

1,689,223

UNITED STATES PATENT OFFICE.

JOHN H. BAUSCHARD, OF ERIE, PENNSYLVANIA.

HEAD-SPACING DEVICE.

Application filed March 11, 1926. Serial No. 93,838.

It is desirable in nailing together temporary structures such as scaffolding to leave the nail heads slightly protruding from the work in order that the nails may be readily withdrawn without undue injury to the material used in the temporary structure. If the nail is not driven home leaving the head simply protruding the strength of the structure is less than where the parts are drawn together by the clamping action of the head of the nail. The present device forms a spacer for the head and the work thus leaving the head protruding so that the nail may be readily withdrawn and at the same time permits the work to be drawn up through the clamping action of the head delivered through the spacing device upon the work. Such devices from the nature of things must be very cheap and preferably are such as to be used with the ordinary, or standard nail. The present invention is designed to fulfill this requirement. Features and details of the invention will appear from the specification and claims.

The invention is illustrated in the accompanying drawings as follows:—

Fig. 1 shows a perspective sectional view with the spacing device in place.

Fig. 2 a section on the line 2—2 in Fig. 1.

Fig. 3 a sectional view on the line 3—3 in Fig. 1.

Fig 4 a perspective view of the spacing device.

Fig. 5 a central cross section of the device.

The spacing device is made of ordinary sheet metal having a perforation 1. The plate is bent to a V-shape with side walls 2 extending downwardly from the perforation. The ends of the plate 3 are preferably brought together. Thus a direct vertical portion of the plate sustains the clamping action of the nail on the spacing device and also reduces the thickness of the ends so that the claws of a hammer will more readily pass by the ends of the plate to engage the nail head.

In Fig. 1 the ordinary scaffold structure is shown having an upright 4 and a cross member 5, the nail 6 having the head 7. The nail extends through the perforation 1 and the edges of the plate bite into the wood slightly but provide an area equal at least to the nail head so that a firm clamping surface is afforded.

In withdrawing the nail a hammer 8 is placed as shown in Fig. 1 with claws 9 under the head. The V-shaped form of the plate forms a sufficient clearance for the head at the apex for the engagement of the claws with the head of the nail and the bending together of the sides toward the ends gives added clearance so as not to obstruct the diverging claws.

What I claim as new is:—

1. A head spacing device for nails comprising a short V-shaped plate perforated at the apex and having the opposing slopes more nearly parallel at the ends than the center.

2. A head spacing device for nails comprising a short plate bent into V-shaped and perforated at the apex and having the opposing slopes of the plate brought togeher at the ends.

3. The combination with a nail having a head of a head spacing device comprising a short plate bent into V-shape and perforated at the apex through which the nail extends, said plate having its slopes more nearly parallel at the ends than the center.

4. The combination with a nail having a head of a head spacing device comprising a short plate bent into V-shape and perforated at the apex through which the nail extends and having the opposing slopes of the plate brought together at the ends.

In testimony whereof I have hereunto set my hand.

JOHN H. BAUSCHARD.